May 5, 1936.  V. W. KLIESRATH  2,039,317

VEHICLE

Filed March 25, 1933  2 Sheets-Sheet 1

INVENTOR.
Victor W. Kliesrath
BY
*ATTORNEY*

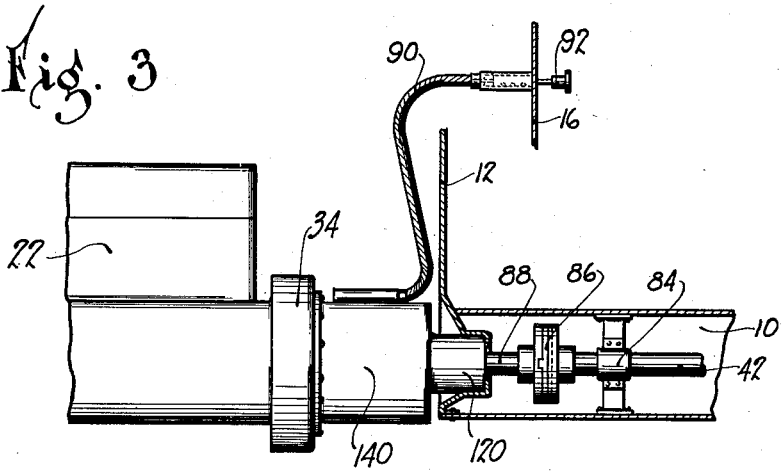
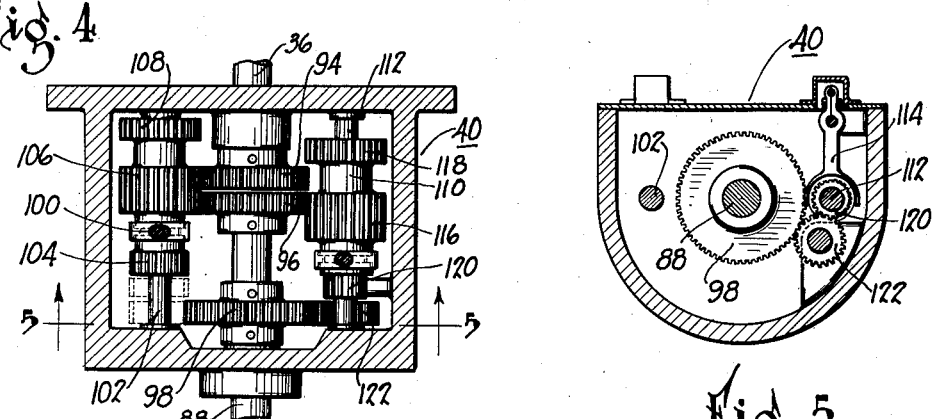
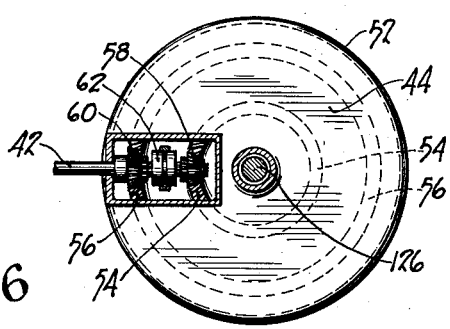

Patented May 5, 1936

2,039,317

UNITED STATES PATENT OFFICE 2,039,317

VEHICLE

Victor W. Kliesrath, South Bend, Ind., assignor to The Steel Wheel Corporation, Chicago, Ill., a corporation of New York Application March 25, 1933, Serial No. 662,738

8 Claims. (Cl. 180—70)

This invention relates to vehicles such as automobiles, and is illustrated as embodied in a novel automobile having individually-sprung wheels and having the engine supported so that the reaction torque of the engine is transmitted to the road wheels, and preferably to the front wheels.

In one arrangement the engine is pivotally mounted at the front of the vehicle so that it can rock about an axis extending lengthwise of the vehicle, and the individual suspensions for the two front wheels are carried directly to the opposite sides of the engine and therefore transmit the engine reaction torque directly to the wheels. The drive from the engine is taken rearwardly through a propeller shaft or the like, preferably arranged substantially in the axis about which the engine is mounted to rock, and is transmitted to the rear wheels through a differential or the like which is shown mounted on the body of the vehicle.

Another feature of the invention relates to sub-dividing the speed changes in the transmission mechanism, in a vehicle of this type, by providing a two-speed differential or the like which drives the rear wheels together with a small transmission which may conveniently have two forward speeds and one reverse speed, arranged immediately behind the engine. This transmission may either be mounted on the body of the vehicle or may form a part of the engine unit and be mounted to rock with the engine itself.

The above and other features of the invention, including various novel combinations of parts and desirable particular constructions, will be apparent from the following description of the illustrative embodiment shown in the accompanying drawings, in which:

Figure 3 is a longitudinal section showing a portion of a modification in which the transmission forms a part of the engine unit instead of being mounted on the body as in Figure 1;

Figure 4 is a horizontal section through one form of transmission unit, showing the change-speed gears in top plan view;

Figure 5 is a section on the line 5—5 of Figure 4, showing the arrangement of the reverse gearing; and Figure 6 is a diagrammatical section at the rear of the vehicle showing the arrangement of the parts of the two-speed differential.

Figure 1:
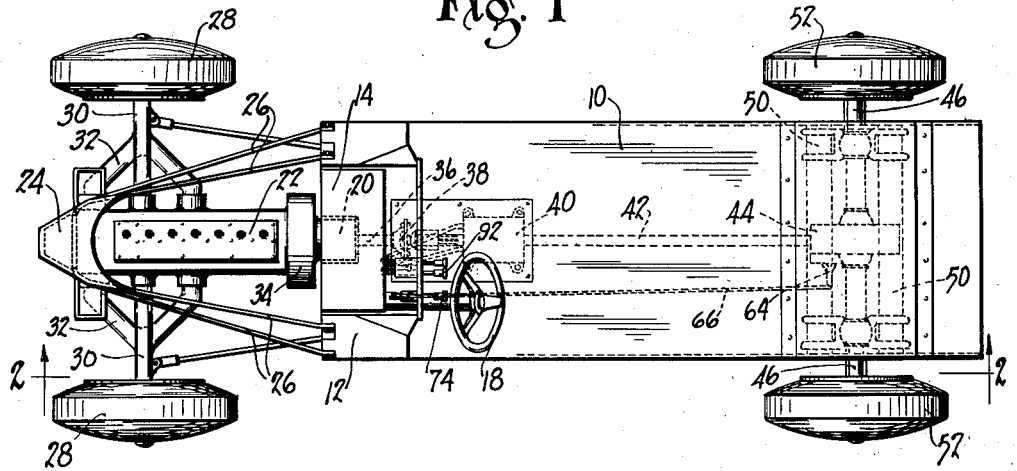
Figure 1 is a top plan view of an automobile chassis embodying the invention.

The invention as shown in Figure 1 is embodied in a vehicle of the general type fully described in my application No. 651,821 filed January 14, 1933. In this vehicle there is a body having a box-section base 10 built up in a reinforced manner of stamped sheet metal, and forming in effect a substitute for the usual chassis frame. At the front end of this box-section base or frame member is an upstanding transversely-extending dash 12, which is shown as carrying a fuel tank 14 and an instrument board 16 arranged just forwardly of the steering wheel 18.

The dash 12 is formed at its center with a bearing pivotally receiving (through a rubber bushing or the like) a boss 20 at the rear end of an engine 22. The engine 22, as explained in my prior application, has its front end pivotally supported (through a rubber bushing or the like) in a bearing 24 supported from the dash 12 by forwardly-extending converging supporting arms 26. As is also explained in said prior application, the vehicle has front road wheels 28 swiveled at the outer ends of axle members or sections including upper straight sections 30 and lower Y-shaped sections 32. The inner ends of the sections 30 and 32 are mounted in rubber directly in sockets formed in opposite sides of the engine and therefore yieldingly transmit directly to the road wheels 28 the reaction torque of the engine. The engine 22 is shown as formed in a unit with a suitable clutch 34.

The drive from the clutch 34 is transmitted, through a short shaft 36 and a flexible coupling 38 of any desired form, to a transmission unit 40 which may be of the novel form further described below having two forward speeds and one reverse speed. The drive from the transmission 40 is through a propeller shaft 42 which is supported at its forward end by the transmission 40 and at its rear end by a two-speed differential 44 carried by the rear end of the base or frame member 10.

The spring suspension at the rear of the vehicle in substantially as described in my said prior application and includes upper straight axle sections 46 and lower Y-shaped axle sections 48 mounted in rubber sockets carried by transverse cylindrical frame members 50 secured to the body. The axle sections have the rear driven road wheels 52 rotatably mounted in any desired manner at their outer ends.

One form of a two-speed differential is shown diagrammatically in Figure 6 and includes an inner smaller ring gear 54 and an outer larger ring gear 56 meshing respectively with pinions 58 and 60 freely sleeved on the propeller shaft 42. The pinions 58 and 60 can be selectively clutched to the propeller shaft 42 by moving rearwardly or forwardly a clutch element 62 keyed on the propeller shaft between the two pinions and operated by a short lever 64 (Figure 1) shown as operated by a rod or cable 66. The cable 66 may be operated in any desired manner, and is illustrated for convenience as connected to a bell crank lever 68 just below the instrument board and inside the hollow box-section base 10, operated by an upwardly-extending link 70 connected to a bell crank 72 pivoted on the instrument board and operated by a plunger 74 placed for convenient manipulation by the driver just in front of the steering wheel 18. It will be observed that moving the plunger 74 in or out, shifts between the high and low speeds of the two-speed differential.

Figure 2:
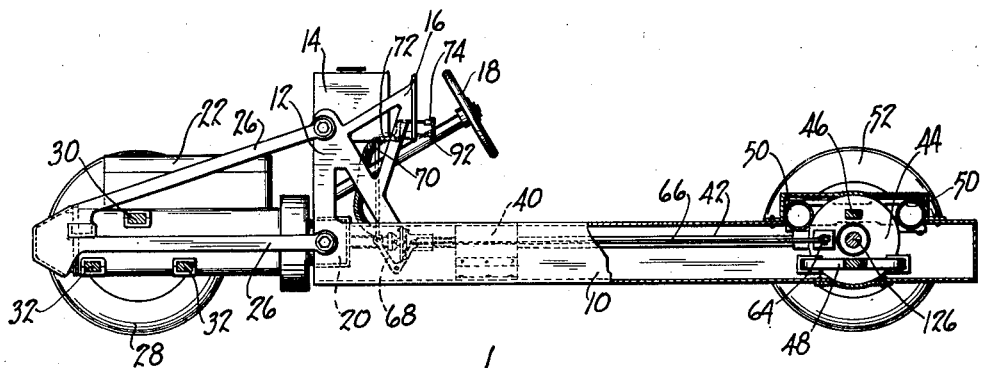
Figure 2 is a longitudinal section through the chassis on the line 2—2 of Figure 1 and showing the major portion of the chassis in side elevation.

As mentioned above, in the arrangement of Figures 1 and 2 the transmission 40 is mounted on the body and is driven from the engine clutch unit through a flexible drive connection 38. In the arrangement of Figure 3 the transmission 140 which corresponds to the transmission 40 in Figure 1 is formed as a rigid part of the engine unit and has the rubber mounted pivotal projection 120 formed thereon. In this case the propeller shaft 42 has a bearing 84 carried by the body 10, and the forward end of the propeller shaft is connected by a suitable flexible driving connection 86 of any desired construction with the shaft 88 which projects rearwardly from the transmission. The usual longitudinally-movable shifter rods or plungers in the top of the transmission, in either embodiment, are operated by means such as suitable flexible Bowden controls 90 having handles 92 arranged side by side on the instrument board and interlocked as explained in my application No. 651,821, filed January 14, 1933.

One form of transmission which may be used is shown in Figures 4 and 5. In this form the shaft 36 extending from the clutch has within the transmission at its rear end a pinion 94, and the shaft 88 which extends out at the rear end of the transmission has a pinion 96 at its front end which is immediately adjacent the pinion 94. This latter shaft also has secured thereto a pinion 98. A gear cluster at the left side of the transmission which is operated by a shifter fork 100 actuated by one of the handles 92, and which gear cluster is slidably mounted on a fixed countershaft 102, includes a pinion 104 having an idle position as shown in full lines in Figure 4 but which can be shifted rearwardly to mesh with the pinion 98.

This gear cluster also has a wide pinion 106 adapted in the high speed or direct drive position to engage both of the pinions 94 and 96, to key them together so that they rotate in unison. At its extreme forward end this gear cluster has a pinion 108 which meshes with the pinion 94 at the time that the pinion 104 meshes with the pinion 98. At this time therefore the drive is at low speed from the pinion 94 through the pinions 108 and 104 to the pinion 98. Between the high and low speed positions the gear cluster is not driven by the pinion 94 and remains idle in neutral position.

A gear cluster 110 at the right side of the transmission is slidably mounted on a fixed shaft 112 and is actuated by the other shifter fork 114 operated by the other handle 92. This gear cluster includes a wide pinion 116 which in the forward position of the gear cluster, keys the two pinions 94 and 96 together the same as described for the pinion 106 and which, when moved rearwardly, has a pinion 118 which is brought into mesh with the pinion 94 and a pinion 120 which is at the same time brought into mesh with an idler pinion 122 which reverses the direction of rotation and which is constantly in mesh with pinion 98.

It will be seen that the transmission mechanism described will give two forward speeds and one reverse speed, which speeds are entirely independent of the two speeds obtainable in the differential 44. There are therefore, in effect, altogether four forward speeds and two reverse speeds.

The differential 44 is arranged to drive the rear road wheels 52 through the medium of axle shafts 126 connected to the differential and to the wheels through universal joints of any desired character.

While one illustrative embodiment has been described in detail it is not my intention to limit the scope of the invention to that particular embodiment, or otherwise than by the terms of the appended claims.

I claim:
1. A vehicle having front and rear wheels, a chassis part supported on the rear wheels, an engine movably mounted on the chassis part and having individual spring suspension devices supporting it on the front wheels, whereby the front portion of the chassis part is supported on the front wheels through the engine in a manner permitting said wheels to move independently of each other and whereby the engine reaction torque is transmitted directly to the front wheels, and means driven by the engine and which means drives the rear wheels.

2. A vehicle having front and rear wheels, a chassis part supported on the rear wheels, an engine pivotally mounted on the chassis part for movement relatively thereto about a substantially fixed axis extending lengthwise of the vehicle and having connected thereto and projecting laterally from its opposite sides members yieldingly supporting it on the front wheels and permitting said wheels to move vertically relatively to the engine independently of each other, whereby the front portion of the chassis part is supported on the front wheels through the engine, and means driven by the engine and including a shaft in said axis at the near end of the engine and which means drives the rear wheels.

3. A vehicle having front and rear wheels, a chassis part having independent spring suspension devices supporting it on the rear wheels, an engine pivotally mounted on the chassis part for movement relatively thereto about a substantially fixed axis extending lengthwise of the vehicle and having members connected thereto and independently supporting it on the front wheels independently of each other, whereby the front portion of the chassis part is supported on the front wheels through the engine, a propeller shaft driven by the engine and extending from the engine to the rear end of the vehicle approximately in line with the axis of the engine mounting and supported on the chassis part between said independent spring suspension devices, and flexibly-jointed means extending transversely of the vehicle and driven by the rear end of the propeller shaft and arranged to drive the rear wheels.

4. A vehicle having front and rear wheels, a chassis part supported on the rear wheels, an engine movably mounted on the chassis part and having individual spring suspension devices supporting it on the front wheels, whereby the front portion of the chassis part is supported on the front wheels through the engine in a manner permitting said wheels to move independently of each other and whereby the engine reaction torque is transmitted directly to the front wheels, a propeller shaft driven by the engine and extending from the engine to the rear end of the vehicle, a differential driven by the rear end of the propeller shaft, and live axles extending transversely of the vehicle and driven by the differential and arranged to drive the rear wheels.

5. A vehicle having front and rear wheels, an engine, an individual spring suspension for each wheel, the two front spring suspensions engaging and supporting the engine and also transmitting the engine reaction torque directly to the front wheels, a chassis part having its front end mounted on the engine and its rear end mounted on the two rear spring suspensions, a differential mounted on the chassis part between the rear wheels and driven by said engine, and live axles driven by the differential and driving the respective rear wheels and flexibly jointed to the differential and the rear wheels.

6. A vehicle having front and rear wheels, an engine, an individual spring suspension for each wheel, the two front spring suspensions engaging and supporting the engine and also transmitting the engine reaction torque directly to the front wheels, a chassis part having its front end mounted on the engine and its rear end mounted on the two rear spring suspensions, a differential mounted on the chassis part between the rear wheels, a propeller shaft driving the differential and supported at its rear end by the differential and driven by said engine, and live axles driven by the differential and driving the respective rear wheels and flexibly jointed to the differential and the rear wheels.

7. A vehicle having front and rear wheels, an engine, an individual spring suspension for each wheel, the two front spring suspensions engaging and supporting the engine and also transmitting the engine reaction torque directly to the front wheels, a chassis part having its front end mounted on the engine and its rear end mounted on the two rear spring suspensions, a differential mounted on the chassis part between the rear wheels, a propeller shaft driving the differential and supported at its rear end by the differential and driven by said engine, a transmission mounted on the chassis part and driven by the engine and driving and supporting the forward end of the propeller shaft, and live axles driven by the differential and driving the respective rear wheels and flexibly jointed to the differential and the rear wheels.

8. A vehicle having a chassis and front and rear wheels, an engine pivotally mounted on a longitudinal axis on said chassis adjacent the front wheels, a differential fixedly mounted on said chassis between the rear wheels, driving connections between the differential and rear wheels, independent spring suspension devices connecting the rear wheels to the chassis, a propeller shaft extending lengthwise of the vehicle and connecting the engine and differential, and connections between the engine and the front wheels for supporting the engine on the front wheels and transmitting the engine reaction torque directly to the front wheels.

VICTOR W. KLIESRATH.